(12) United States Patent
Ogawa et al.

(10) Patent No.: US 9,099,228 B2
(45) Date of Patent: Aug. 4, 2015

(54) MANUFACTURING METHOD OF HONEYCOMB STRUCTURE

(71) Applicant: NGK INSULATORS, LTD., Nagoya (JP)

(72) Inventors: Toru Ogawa, Nagoya (JP); Shuhei Fujita, Nagoya (JP); Shinya Yoshida, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 56 days.

(21) Appl. No.: 13/851,397

(22) Filed: Mar. 27, 2013

(65) Prior Publication Data

US 2013/0255854 A1     Oct. 3, 2013

(30) Foreign Application Priority Data

Mar. 29, 2012   (JP) .................................. 2012-077596
Feb. 18, 2013   (JP) .................................. 2013-029531

(51) Int. Cl.
    *C04B 33/34*     (2006.01)
    *H01B 13/00*     (2006.01)
    (Continued)

(52) U.S. Cl.
    CPC ............. *H01B 13/0016* (2013.01); *B01J 35/04* (2013.01); *B28B 11/041* (2013.01);
    (Continued)

(58) Field of Classification Search
    CPC ........ C04B 35/64; C04B 35/56; C04B 41/51; C04B 41/4511; C04B 41/4501; C04B 41/45; C04B 38/0006; B32B 3/12; C09D 5/38; B01D 46/2418; B28B 19/0038; H05B 3/00; H05B 3/26; F01N 3/2828; F01N 3/28; F01N 3/022

USPC .......................................................... 156/89.22
See application file for complete search history.

(56) References Cited

U.S. PATENT DOCUMENTS 5,063,029 A    11/1991   Mizuno et al.
5,288,975 A     2/1994   Kondo
(Continued)

FOREIGN PATENT DOCUMENTS

EP       0 320 457 A1     6/1989
EP        320457 A1 *   6/1989
(Continued)

OTHER PUBLICATIONS

Mizrah et al., EP 0320457 machine translation, Published Jun. 14, 1989.*

(Continued)

*Primary Examiner* — Alex Efta
(74) *Attorney, Agent, or Firm* — Burr & Brown, PLLC (57) ABSTRACT

The manufacturing method of the honeycomb structure includes a step of coating a surface of each of releasing sheets with a paste for an electrode, to prepare electrode forming sheets in which the releasing sheets are provided with electrode paste films; a formed honeycomb body with the electrode forming sheets forming step of attaching the electrode forming sheets to a side surface of a tubular formed ceramic honeycomb body which is the curved surface to prepare a formed honeycomb body with the electrode forming sheets; and a honeycomb structure forming step of firing the formed honeycomb body, or removing releasing sheets from the formed honeycomb body to form the formed honeycomb body with the pastes for the electrodes, and then firing the formed honeycomb body with the pastes for the electrodes, to obtain a honeycomb structure having a side surface provided with the electrodes.

20 Claims, 7 Drawing Sheets

(51) Int. Cl.
- B28B 19/00 (2006.01)
- B28B 11/04 (2006.01)
- C04B 41/87 (2006.01)
- C04B 41/50 (2006.01)
- C04B 41/00 (2006.01)
- B01J 35/04 (2006.01)
- C04B 41/51 (2006.01)
- C04B 41/45 (2006.01)
- C09D 5/38 (2006.01)
- H05B 3/00 (2006.01)
- H05B 3/26 (2006.01)
- F01N 3/28 (2006.01)
- F01N 3/022 (2006.01)
- C04B 38/00 (2006.01)
- B01D 46/24 (2006.01)
- C04B 111/00 (2006.01)

(52) U.S. Cl.
CPC .......... *B28B 19/0038* (2013.01); *C04B 41/009* (2013.01); *C04B 41/5059* (2013.01); *C04B 41/87* (2013.01); *B01D 46/2418* (2013.01); *C04B 38/0006* (2013.01); *C04B 41/45* (2013.01); *C04B 41/4501* (2013.01); *C04B 41/4511* (2013.01); *C04B 41/51* (2013.01); *C04B 2111/0081* (2013.01); *C09D 5/38* (2013.01); *F01N 3/022* (2013.01); *F01N 3/28* (2013.01); *F01N 3/2828* (2013.01); *H05B 3/00* (2013.01); *H05B 3/26* (2013.01)

(56) References Cited

U.S. PATENT DOCUMENTS

| | | | |
|---|---|---|---|
| 7,083,842 B2 * | 8/2006 | Masukawa et al. | 428/116 |
| 2003/0134084 A1 | 7/2003 | Ichikawa et al. | |
| 2012/0076698 A1 * | 3/2012 | Ishihara | 422/174 |
| 2012/0076699 A1 * | 3/2012 | Ishihara | 422/174 |
| 2012/0187109 A1 * | 7/2012 | Noguchi et al. | 219/553 |
| 2013/0036719 A1 | 2/2013 | Noguchi et al. | |
| 2013/0045137 A1 * | 2/2013 | Sakashita et al. | 422/174 |

FOREIGN PATENT DOCUMENTS

| | | |
|---|---|---|
| EP | 0 368 357 A2 | 5/1990 |
| EP | 0 572 827 A1 | 12/1993 |
| EP | 0 802 071 A1 | 10/1997 |
| JP | 61-215278 A1 | 9/1986 |
| JP | 08-141408 A1 | 6/1996 |
| JP | 10006316 A * | 1/1998 |
| JP | 2011-207116 A1 | 10/2011 |
| JP | 2011207116 A * | 10/2011 |
| WO | 2011/043434 A1 | 4/2011 |
| WO | WO 2011043434 A1 * | 4/2011 |
| WO | 2011/105567 A1 | 9/2011 |
| WO | 2011/125816 A1 | 10/2011 |
| WO | WO 2011125816 A1 * | 10/2011 |

OTHER PUBLICATIONS

Kuno, "JP 2011-207116, machine translation", published Oct. 20, 2011.*

Extended European Search Report (Application No. 13161280.6) dated Jun. 3, 2014.

European Office Action, European Application No. 13 161 280.6, dated Mar. 30, 2015 (6 pages).

* cited by examiner

MANUFACTURING METHOD OF HONEYCOMB STRUCTURE

The present application is an application based on JP-2012-77596 filed on Mar. 29, 2012, and JP-2013-29531 filed on Feb. 18, 2013 with the Japanese Patent Office, the entire contents of which are incorporated herein by reference.

DESCRIPTION OF RELATED ART

1. Field of the Invention

The present invention relates to a manufacturing method of a honeycomb structure, and more particularly, it relates to a manufacturing method of a honeycomb structure in which electrodes can easily be formed on a side surface of the tubular honeycomb structure which is the curved surface.

2. Background Art

Heretofore, a ceramic honeycomb structure onto which a catalyst is loaded has been used to treat harmful substances in an exhaust gas discharged from a car engine. It is known that the honeycomb structure formed by a sintered body of silicon carbide is used to purify the exhaust gas (see, e.g., Patent Document 1).

When the exhaust gas is treated by the catalyst loaded onto the honeycomb structure, it is necessary to raise a temperature of the catalyst to a predetermined temperature. However, there has been the problem that at the start of the engine, the catalyst temperature is low, and hence the exhaust gas cannot sufficiently be purified.

To solve the problem, a method has been investigated in which a heater made of a metal is disposed on an upstream side of a honeycomb structure including a loaded catalyst, to raise a temperature of an exhaust gas (see, e.g., Patent Document 2).

Moreover, it is disclosed that a honeycomb structure including electrodes disposed at both ends of the structure and made of a conductive ceramic material is used as a catalyst support with a heater (see, e.g., Patent Document 3). Furthermore, there is disclosed a ceramic honeycomb structure whose side surface is provided with electrodes and which generates heat by energization (see, e.g., Patent Document 4).

Additionally, when the honeycomb structure is used as the heater, it is usually necessary to form the electrodes in the honeycomb structure. As a method of forming the electrodes on the side surface of a cylindrical honeycomb structure, the following method is disclosed (see, e.g., Patent Document 5). An electrode material (the slurry) is poured into a form (the container), and the electrode material held in the container is brought into contact with the honeycomb structure. Then, while the electrode material held in the container is in contact with the honeycomb structure, the container is elastically deformed, thereby allowing the electrode material to adhere on the side surface of the honeycomb structure. Afterward, the electrode material is subjected to drying or the like, thereby forming the electrodes on the side surface of the cylindrical honeycomb structure.

[Patent Document 1] JP 4136319
[Patent Document 2] JP 2931362
[Patent Document 3] JP-A-08-141408
[Patent Document 4] WO 2011/43434
[Patent Document 5] JP-A-2011-207116

SUMMARY OF THE INVENTION

When the above "ceramic honeycomb structure (the catalyst support) whose side surface is provided with electrodes and generates heat by energization" (see, e.g., Patent Document 4) is prepared, in the case of the cylindrical honeycomb structure, it is necessary to form the electrodes on the side surface of the cylindrical honeycomb structure.

However, heretofore, it has not necessarily been easy to form the electrodes each having a uniform thickness on the side surface of such a cylindrical honeycomb structure.

In contrast, according to the invention disclosed in Patent Document 5, it has been possible to form electrodes each having a uniform thickness on the side surface of the cylindrical honeycomb structure. However, it is not necessarily easy to form two layers of evenly thin film electrodes or to form electrodes in accordance with unevenness of the shape of the honeycomb structure (a middle warp or a trumpet-like shape), and there has been room for further improvement.

The present invention has been developed in view of the above-mentioned problems, and an object thereof is to provide a manufacturing method of a honeycomb structure in which electrodes can easily be formed on a side surface of the tubular honeycomb structure which is the curved surface.

To achieve the above-mentioned object, according to the present invention, the following manufacturing method of a honeycomb structure is provided.

[1] A manufacturing method of a honeycomb structure, including a step of coating a surface of each of releasing sheets with a paste for an electrode, to prepare electrode forming sheets in which the one surface of each of the releasing sheets is provided with an electrode paste film; a formed honeycomb body with the electrode forming sheets forming step of attaching the electrode forming sheets to a side surface of a tubular formed ceramic honeycomb body which is a curved surface, the formed ceramic honeycomb body having partition walls with which a plurality of cells extending from one end surface to the other end surface are formed to become through channels of a fluid, and an outer peripheral wall positioned at the outermost periphery, so that the electrode paste films adhere on the side surface of the formed ceramic honeycomb body, to prepare a formed honeycomb body with the electrode forming sheets which is the formed ceramic honeycomb body having the side surface provided with the electrode forming sheets; and a honeycomb structure forming step of firing the formed honeycomb body with the electrode forming sheets, or removing the releasing sheets from the formed honeycomb body with the electrode forming sheets to form the formed honeycomb body with the pastes for the electrodes, and then firing the formed honeycomb body with the pastes for the electrodes, to obtain a honeycomb structure having the side surface provided with the electrodes.

[2] The manufacturing method of the honeycomb structure according to the above [1], wherein the surface of each of the releasing sheets is coated with the paste for the electrode, to prepare the electrode forming sheets in which the one surface of each of the releasing sheets is provided with the electrode paste film constituted of a plurality of electrode paste layers.

[3] The manufacturing method of the honeycomb structure according to the above [1] or [2], wherein a surface roughness Ra of the releasing sheet is from 0.05 to 10 μm.

[4] The manufacturing method of the honeycomb structure according to any one of the above [1] to [3], wherein the surface roughness Ra of the releasing sheet is smaller than a surface roughness Ra of the formed ceramic honeycomb body.

[5] The manufacturing method of the honeycomb structure according to any one of the above [1] to [4], wherein a water absorption of the releasing sheet is from 0.003 to 0.12 g/minute.

[6] The manufacturing method of the honeycomb structure according to any one of the above [1] to [5], wherein a thickness of each of the electrode paste films which adhere on the side surface of the formed honeycomb body with the pastes for the electrodes is from 10 to 5000 μm.

[7] The manufacturing method of the honeycomb structure according to any one of the above [1] to [6], wherein in a cross section of the honeycomb structure which is orthogonal to an extending direction of the cells, 0.5 time a center angle of each of the electrodes is from 15° to 65°.

In a manufacturing method of a honeycomb structure of the present invention, electrode forming sheets are attached to a side surface of a tubular formed ceramic honeycomb body which is the curved surface, and electrode paste films are fired to form electrodes. Therefore, it is possible to easily form the electrodes on the side surface of the tubular honeycomb structure which is the curved surface.

DETAILED DESCRIPTION OF THE INVENTION

Next, embodiments of the present invention will be described in detail with reference to the drawings. It should be understood that the present invention is not limited to the following embodiments and that design change, improvement and the like are suitably added on the basis of ordinary knowledge of a person skilled in the art without departing from the gist of the present invention.

(1) Manufacturing Method of Honeycomb Structure:

(1-1) Formed Honeycomb Body with Electrode Forming Sheets Forming Step;

A formed honeycomb body with electrode forming sheets forming step in one embodiment of a manufacturing method of a honeycomb structure of the present invention is as follows. The surface of a releasing sheet 22 is coated with a paste for an electrode to prepare an electrode forming sheet 23 in which one surface of an electrode paste film 6 is provided with the releasing sheet 22 (see FIG. 1). Then, the electrode forming sheets 23 are attached to "a side surface 5 of a tubular formed ceramic honeycomb body 100 which is the curved surface" so that each of the electrode paste films 6 adheres on the side surface 5 of the formed ceramic honeycomb body 100 (see FIG. 4 to FIG. 6). In consequence, a formed honeycomb body 110 with the electrode forming sheets is obtained (see FIG. 4 to FIG. 6). Here, the tubular formed ceramic honeycomb body 100 having the side surface 5 which is the curved surface has partition walls 1 with which a plurality of cells 2 "extending from one end surface 11 to the other end surface 12" are formed to become through channels of a fluid, and an outer peripheral wall 3 positioned at the outermost periphery (see FIG. 2 and FIG. 3). It is to be noted that the side surface 5 is the surface of the outer peripheral wall 3.

Figure 1:
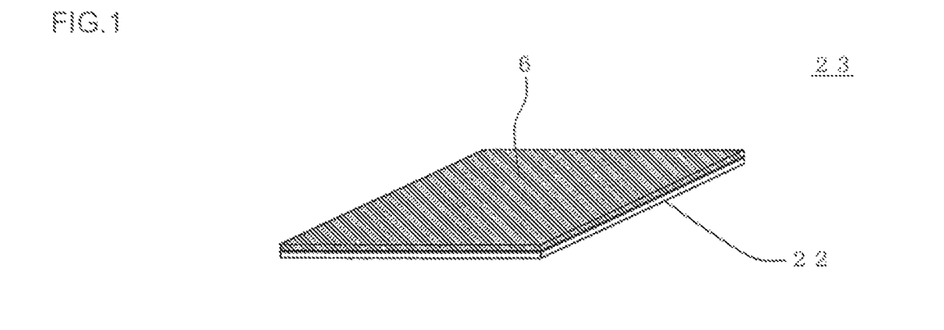
FIG. 1 is a perspective view schematically showing an electrode forming sheet prepared in a manufacturing process of a honeycomb structure in one embodiment of a manufacturing method of the honeycomb structure of the present invention.
Figure 2:
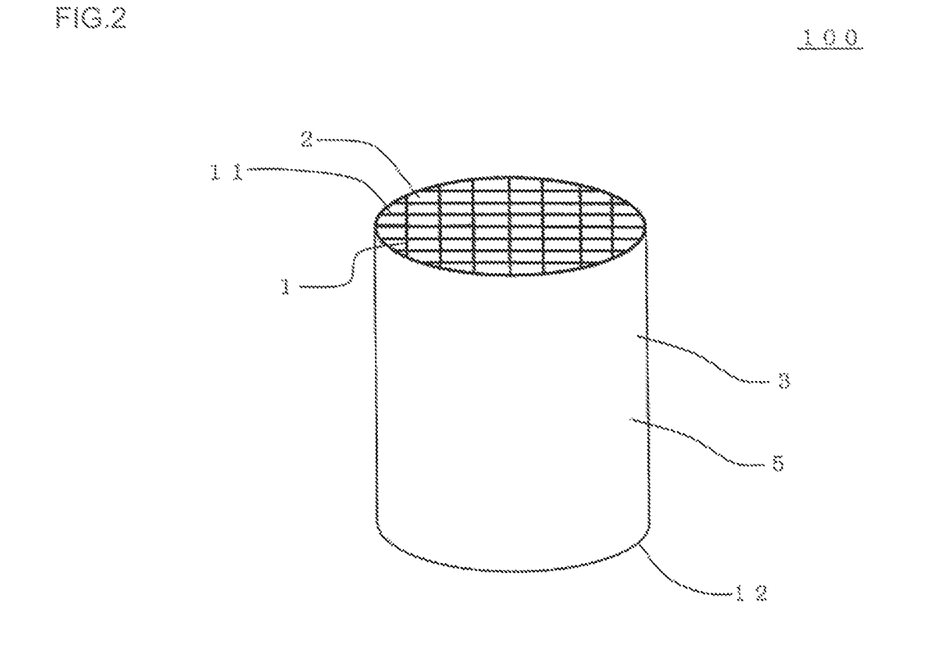
FIG. 2 is a perspective view schematically showing a formed ceramic honeycomb body having a side surface to which the electrode forming sheets are to be attached in the embodiment of the manufacturing method of the honeycomb structure of the present invention.
Figure 3:
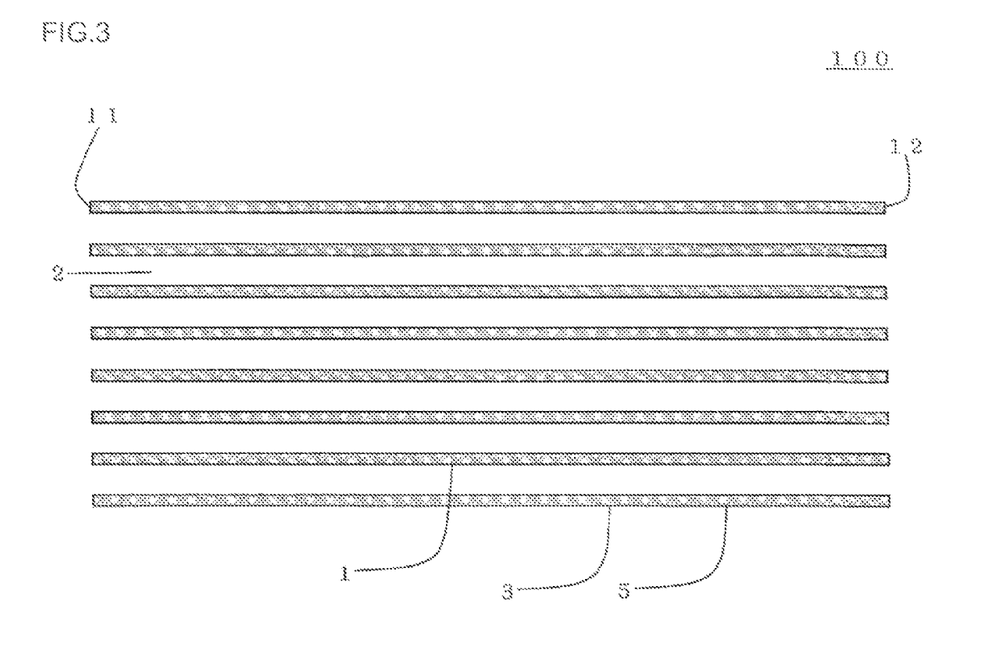
FIG. 3 is a schematic view showing a cross section parallel to a cell extending direction of the formed ceramic honeycomb body having the side surface to which the electrode forming sheets are to be attached, in the embodiment of the manufacturing method of the honeycomb structure of the present invention.
Figure 4:
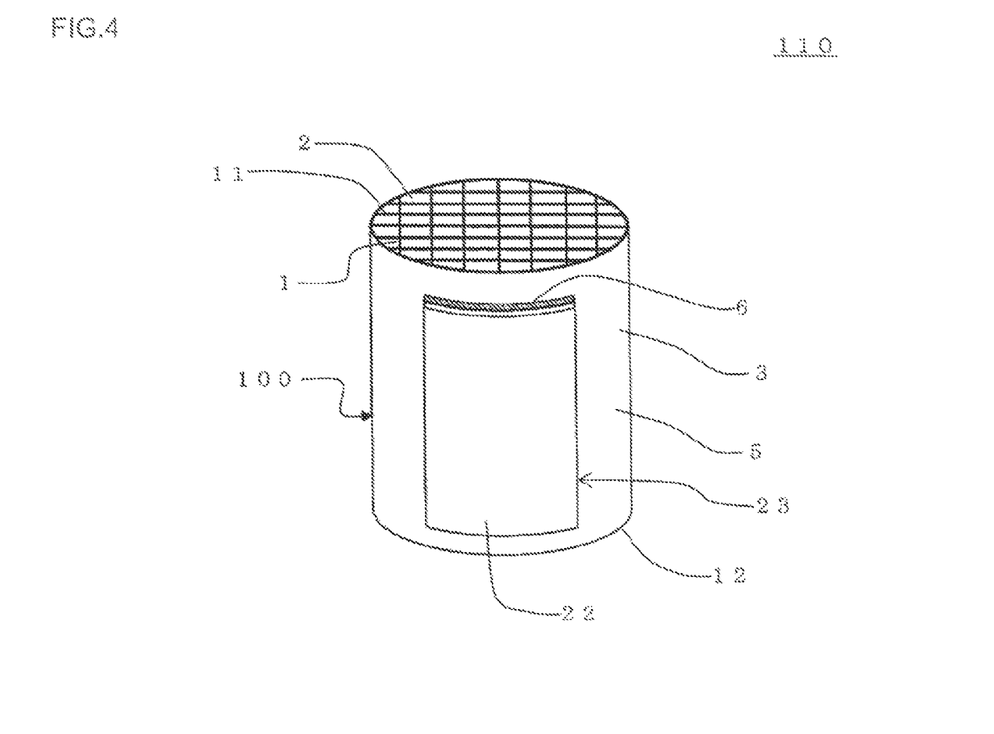
FIG. 4 is a perspective view schematically showing the formed honeycomb body with the electrode forming sheets which is prepared in the manufacturing process of the honeycomb structure, in the embodiment of the manufacturing method of the honeycomb structure of the present invention.
Figure 5:
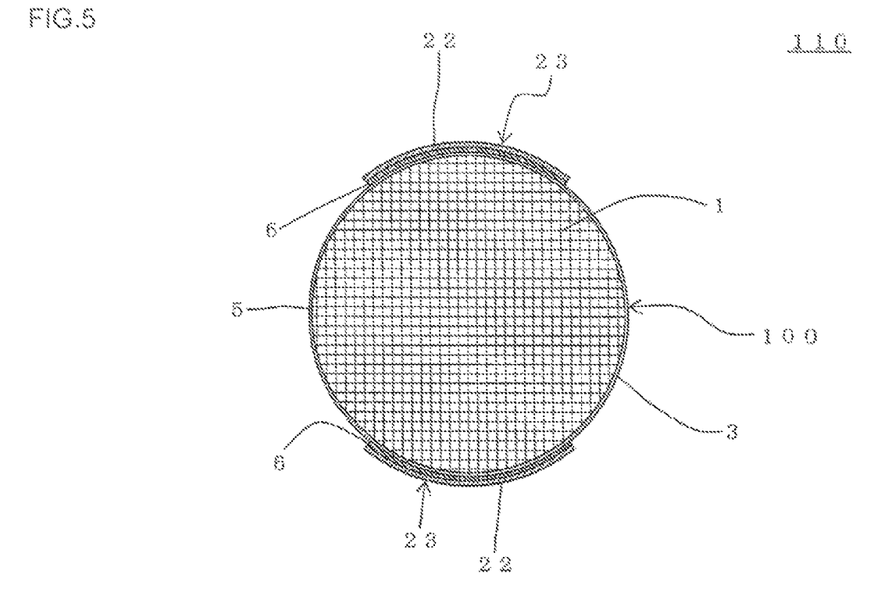
FIG. 5 is a schematic view showing a cross section orthogonal to the cell extending direction of the formed honeycomb body with the electrode forming sheets which is prepared in the manufacturing process of the honeycomb structure, in the embodiment of the manufacturing method of the honeycomb structure of the present invention.
Figure 6:
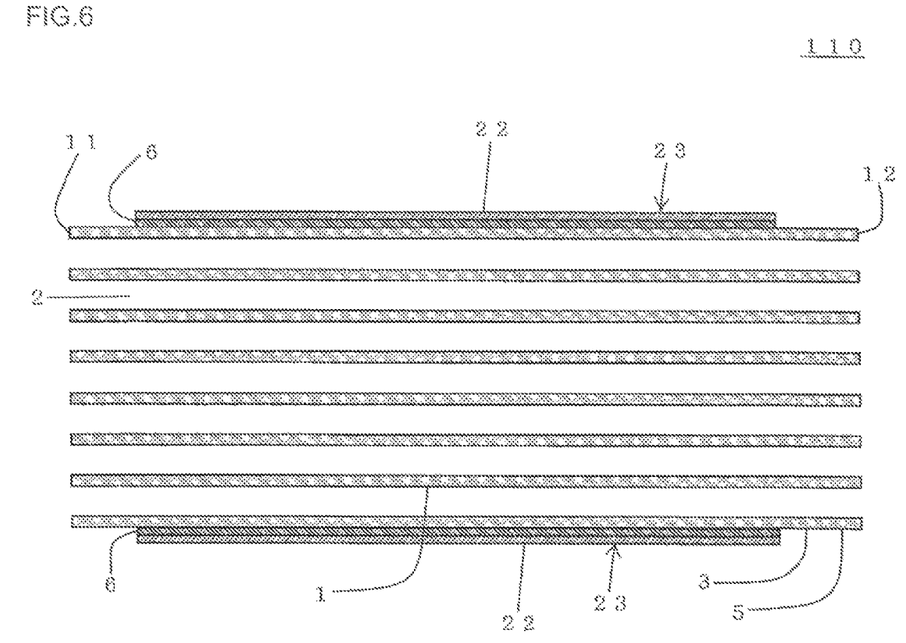
FIG. 6 is a schematic view showing a cross section parallel to the cell extending direction of the formed honeycomb body with the electrode forming sheets which is prepared in the manufacturing process of the honeycomb structure, in the embodiment of the manufacturing method of the honeycomb structure of the present invention.

FIG. 1 is a perspective view schematically showing the electrode forming sheet 23 prepared in a manufacturing process of the honeycomb structure in the embodiment of the manufacturing method of the honeycomb structure of the present invention. FIG. 2 is a perspective view schematically showing the formed ceramic honeycomb body 100 having the side surface to which the electrode forming sheets are to be attached, in the embodiment of the manufacturing method of the honeycomb structure of the present invention. It is to be noted that in the formed ceramic honeycomb body 100 shown in FIG. 2, the electrode forming sheets have not been attached yet. FIG. 3 is a schematic view showing a cross section parallel to a cell extending direction of the formed ceramic honeycomb body 100 having the side surface to which the electrode forming sheets are to be attached, in the embodiment of the manufacturing method of the honeycomb structure of the present invention. It is to be noted that in the formed ceramic honeycomb body 100 shown in FIG. 3, the electrode forming sheets have not been attached yet. FIG. 4 is a perspective view schematically showing the formed honeycomb body 110 with the electrode forming sheets which is prepared in the manufacturing process of the honeycomb structure, in the embodiment of the manufacturing method of the honeycomb structure of the present invention. FIG. 5 is a schematic view showing a cross section orthogonal to the cell extending direction of the formed honeycomb body 110 with the electrode forming sheets which is prepared in the manufacturing process of the honeycomb structure, in the embodiment of the manufacturing method of the honeycomb structure of the present invention. FIG. 6 is a schematic view showing a cross section parallel to the cell extending direction of the formed honeycomb body 110 with the electrode forming sheets which is prepared in the manufacturing process of the honeycomb structure, in the embodiment of the manufacturing method of the honeycomb structure of the present invention.

Moreover, two electrode forming sheets 23 are preferably prepared, and the two electrode forming sheets 23 are preferably arranged on the side surface of the formed ceramic honeycomb body 100 (see FIG. 4 to FIG. 6). In consequence, it is possible to prepare the formed honeycomb body with the electrode forming sheets, which has a pair of electrode forming sheets 23. By the pair of electrode forming sheets, a pair of electrodes of the finally obtained honeycomb structure can be obtained. In the formed honeycomb body 110 with the electrode forming sheets, a thickness of each of the electrode paste films 6 is preferably from 10 to 5000 µm, and further preferably from 100 to 250 µm. When the thickness is smaller than 10 µm, electric resistances of the electrodes of the obtained honeycomb structure increase, and hence heat cannot evenly be generated. When the thickness is larger than 5000 µm, the electrodes are easily damaged at canning of the obtained honeycomb structure.

There is not any special restriction on a method of preparing the electrode forming sheet 23, but an example of the method is as follows. For example, a paste for the electrode is directly applied to the releasing sheet, the surface of the paste for the electrode is smoothened by using a squeegee, and an extra paste for the electrode and air bubble are removed in this preferable method.

Figure 9:
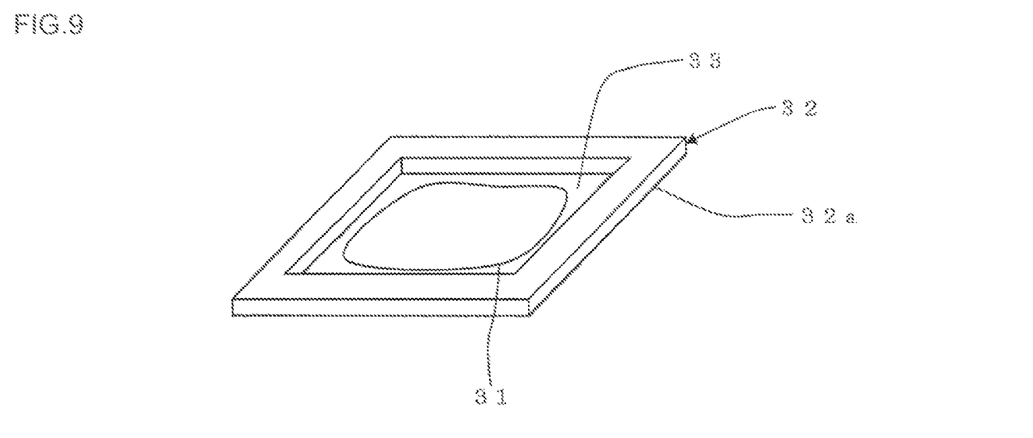
FIG. 9 is a perspective view schematically showing a state where the paste for the electrode is allowed to adhere on a plate, in the embodiment of the manufacturing method of the honeycomb structure of the present invention.
Figure 10:
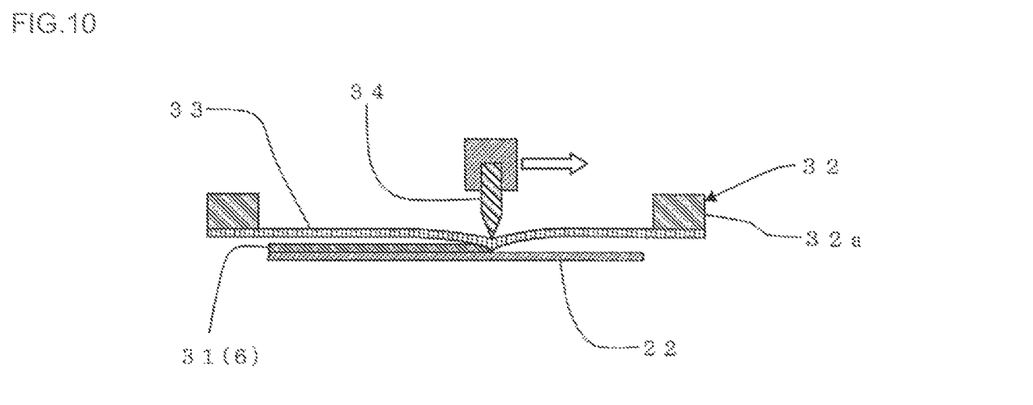
FIG. 10 is a cross-sectional view schematically showing a state where the surface of a releasing sheet is coated with the paste for the electrode, in the embodiment of the manufacturing method of the honeycomb structure of the present invention.

Moreover, a method of coating the releasing sheet with the paste for the electrode by printing by use of a plate is a further preferable method. Specifically, first, as shown in FIG. 9, a paste 31 for the electrode is held by (adheres on) a plate 32. The plate 32 is obtained by disposing a printing screen 33 in a frame member 32a. Then, the paste 31 for the electrode is preferably held by the printing screen 33. Then, as shown in FIG. 10, the plate 32 which holds the paste for the electrode is disposed on the surface of the releasing sheet 22. Then, a squeegee 34 is moved in one direction while pressing the releasing sheet 22 via the printing screen 33. In consequence, the releasing sheet 22 is coated with the paste 31 for the electrode which has been held by the printing screen 33. Therefore, the electrode forming sheet is obtained. It is to be noted that the releasing sheet 22 coated with the paste 31 for the electrode is further coated with the paste 31 for the electrode again or as much as a plurality of times. The number of times of the coating with the paste 31 for the electrode is preferably two to five in total. Moreover, a viscosity of the paste for the electrode is preferably from 2 to 15 mPa·s. When the viscosity is smaller than 2 mPa·s, due to the low viscosity, a thick electrode paste film cannot easily be formed sometimes. When the viscosity is larger than 15 mPa·s, due to the high viscosity, the surface of the releasing sheet 22 is not easily coated evenly with the paste for the electrode sometimes. FIG. 9 is a perspective view schematically showing a state where the paste for the electrode is allowed to adhere on the plate, in the embodiment of the manufacturing method of the honeycomb structure of the present invention. FIG. 10 is a cross-sectional view schematically showing a state where the surface of the releasing sheet is coated with the paste for the electrode, in the embodiment of the manufacturing method of the honeycomb structure of the present invention.

The squeegee is preferably formed in a plate-like shape which is long in one direction. It is to be noted that the squeegee 34 shown in FIG. 10 has the plate-like shape which is long in the one direction. Moreover, FIG. 10 shows a cross section of the squeegee 34 which is orthogonal to a longitudinal direction. A material of the squeegee 34 is preferably urethane or the like. Moreover, a hardness of the squeegee is preferably from 30 to 90 degrees (°), and further preferably from 60 to 80 degrees. When the hardness of the squeegee is in such a range, the thickness of the electrode paste film can easily be controlled. When the hardness of the squeegee is smaller than 30 degrees, the squeegee softens, and hence the releasing sheet is not easily coated with the paste for the electrode in a uniform thickness sometimes. When the hardness is larger than 90 degrees, the thickness of the electrode paste film cannot be increased to a desirable thickness sometimes. The hardness of the squeegee is Hs (Shore) hardness by a hardness meter of JIS K603 standard.

As shown in FIG. 9, the plate 32 preferably includes the frame member 32a and the printing screen 33 disposed in the frame member 32a. There is not any special restriction on the frame member 32a, as long as the frame member has a structure formed in such a ring-like shape as to surround an outer edge of the printing screen 33. There is not any special restriction on a material of the frame member 32a, but the material is preferably stainless steel, aluminum, iron or the like.

As the printing screen 33, a mesh-like screen, a sheet-like screen or the like is preferably used. When the mesh-like screen is used as the printing screen 33, the screen may be used as it is, or a resin, a metal or the like may be attached onto the printing screen so as to form a desirable printing pattern. When the resin, the metal or the like is attached onto the printing screen, a mesh portion shape to which the resin, the metal or the like is not attached becomes the printing pattern. Moreover, when the sheet-like screen is used as the printing screen 33, a hole is preferably made in the screen to form a desirable printing pattern (the hole).

A thickness of the printing screen 33 is preferably from 100 to 300 µm, and further preferably from 150 to 250 µm. When the thickness of the printing screen 33 is in such a range, the thickness of each of the electrodes of the obtained honeycomb structure can be increased. Specifically, the thickness of the electrode of the honeycomb structure can be from 10 to 5000 µm. When the thickness of the printing screen 33 is smaller than 100 µm, the electrodes of the obtained honeycomb structure become excessively thin sometimes. When the thickness of the printing screen 33 is larger than 300 µm, the electrodes of the obtained honeycomb structure become uneven sometimes.

There is not any special restriction on a material of the printing screen 33, but an example of the material is Tetron (registered trademark).

In the manufacturing method of the honeycomb structure of the present embodiment, a surface roughness Ra of the releasing sheet is preferably from 0.05 to 10 µm, and further preferably from 0.1 to 5 µm. When the surface roughness Ra of the releasing sheet is in such a range, electrode paste formability is effectively enhanced. Furthermore, an adhesion between the paste for the electrode and the releasing sheet is effectively acquired. When the surface roughness Ra of the releasing sheet is smaller than 0.05 µm, the paste for the electrode is not easily fixed to the releasing sheet, and the film is not easily formed sometimes. When the surface roughness Ra of the releasing sheet is larger than 10 µm, the sheet is rougher than the side surface of the formed ceramic honeycomb body. Therefore, when the releasing sheets are peeled after attaching the electrode forming sheets to the side surface of the formed ceramic honeycomb body, the interface adhesion between the side surface of the formed ceramic honeycomb body and the paste for the electrode deteriorates, and peel defects take place sometimes. Moreover, the surface roughness Ra of the releasing sheet is preferably smaller than the surface roughness Ra of the formed ceramic honeycomb body. In consequence, when the releasing sheets are peeled after attaching the electrode forming sheets to the side surface of the formed ceramic honeycomb body, the releasing sheets are easily peeled off. The surface roughness Ra is a value measured by using "Surfcom 480A" (a surface roughness/contour shape measuring instrument) manufactured by Tokyo Seimitsu Co., Ltd. Measurement conditions are a length of 4 mm, a measuring speed: 0.3 mm/sec., and a cutoff value: 0.8.

A water absorption of the releasing sheet is preferably from 0.003 to 0.12 g/minute, and further preferably from 0.005 to 0.05 g/minute. When the water absorption of the releasing sheet is in such a range, the surface of the paste for the electrode is held in a wet state, and can be prevented from drying from a time when the paste for the electrode is prepared to a time when the electrode forming sheet is attached to the honeycomb structure. When the water absorption is smaller than 0.003 g/minute, the paste for the electrode is not easily fixed to the releasing sheet, and the film is not easily formed sometimes. When the water absorption is larger than 0.12 g/minute, the surface (the surface to be attached) of the electrode paste film formed on the electrode forming sheet dries, and cannot be attached to the honeycomb structure sometimes. The water absorption of the releasing sheet is a value (an increase of a mass of the releasing sheet) obtained by a method of measuring a mass change (the mass increase) of the releasing sheet having a dimension of 70 mm×70 mm and immersed into water for one minute.

Examples of a material of the releasing sheet include paper, and a plastic material such as polyethylene terephthalate (PET). Furthermore, the releasing sheet is preferably a release paper, a dust-free paper, or a PET film. Here, the dust-free paper is such a paper as to suppress generation of dust, for use in a clean room. Further specifically, the paper does not contain a pigment for preventing the paper from being colored or transparent, has longer fibers than a plain paper, and is impregnated with an acrylic resin. Moreover, the release paper is a paper obtained by coating one surface of the plain paper with silicon.

A thickness of the releasing sheet is preferably from 38 to 300 µm, and further preferably from 50 to 150 µm. When the thickness is smaller than 38 µm, a strength deteriorates sometimes, and the sheet does not easily peel from the electrode paste film sometimes. When the thickness is larger than 300 µm, the electrode forming sheet is not easily attached to the formed ceramic honeycomb body sometimes.

In the manufacturing method of the honeycomb structure of the present embodiment, the paste for the electrode is preferably a mixture of silicon carbide powder (silicon carbide), metal silicon powder (metal silicon), a binder, a surfactant, a pore former, a releasing material, water and the like.

The paste for the electrode is preferably formed by adding a predetermined additive to the silicon carbide powder and the silicon powder, and kneading these materials. There is not any, special restriction on a kneading method, and for example, a vertical stirrer can be used.

Specifically, the paste for the electrode is preferably prepared by adding the metal silicon powder (metal silicon), the binder, the surfactant, the pore former, the water and the like to the silicon carbide powder (silicon carbide), and kneading these materials. When a total mass of the silicon carbide powder and metal silicon is 100 parts by mass, the mass of metal silicon is preferably from 20 to 40 parts by mass.

Examples of the binder include methylcellulose, hydroxypropyl methylcellulose, hydroxypropoxyl cellulose, hydroxyethylcellulose, carboxymethylcellulose, and polyvinyl alcohol. Among these binders, methylcellulose and hydroxypropoxyl cellulose are preferably used together. A content of the binder is preferably from 0.1 to 5.0 parts by mass, when the total mass of the silicon carbide powder and the metal silicon powder is 100 parts by mass.

A content of the water is preferably from 15 to 60 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used, or a two or more of the surfactants may be used as a combination. A content of the surfactant is preferably from 0.1 to 2.0 parts by mass, when the total mass of the silicon carbide powder and the metal silicon powder is 100 parts by mass.

There is not any special restriction on the pore former, as long as the pore former becomes pores after fired. Examples of the pore former include graphite, starch, resin balloons, a water-absorbing resin, and silica gel. A content of the pore former is preferably from 0.1 to 5.0 parts by mass, when the total mass of the silicon carbide powder and the metal silicon powder is 100 parts by mass. An average particle diameter of the pore former is preferably from 10 to 30%.

There is not any special restriction on a method of attaching the electrode forming sheet to the side surface of the formed ceramic honeycomb body. The electrode forming sheet may be grasped by hands or a machine, and attached to the side surface of the formed ceramic honeycomb body. Moreover, the electrode forming sheet may be attached to the side surface of the formed ceramic honeycomb body by the following method. First, the electrode forming sheet is disposed so that the surface of the electrode paste film faces the upside in a vertical direction. Then, the formed ceramic honeycomb body is rolled, and allowed to pass on the electrode paste film. At this time, when the formed ceramic honeycomb body rolls on the electrode paste film, the electrode paste film (the electrode forming sheet) is attached to the side surface of the formed ceramic honeycomb body. Such a method of attaching the electrode forming sheet to the side surface of the formed ceramic honeycomb body is also a preferable method. Moreover, when a pair of (two) electrode paste films are attached to the side surface of the formed ceramic honeycomb body, the two electrode forming sheets are preferably disposed (side by side) via a predetermined space. Furthermore, the formed ceramic honeycomb body preferably rolls on the two electrode paste films.

Additionally, after attaching the electrode forming sheet to the side surface of the formed ceramic honeycomb body, a pressure is preferably applied onto the electrode forming sheet by use of a roller, so that the electrode forming sheet comes in contact closely with the side surface of the formed ceramic honeycomb body.

In the manufacturing method of the honeycomb structure of the present embodiment, there is not any special restriction on a method of preparing the formed ceramic honeycomb body, and a known method can be used. For example, the following method can be used.

First, metal silicon powder (metal silicon), a binder, a surfactant, a pore former, water and the like are added to silicon carbide powder (silicon carbide), to prepare a forming raw material. A mass of metal silicon is preferably from 10 to 40 mass % to the total of the mass of the silicon carbide powder and the mass of metal silicon. An average particle diameter of silicon carbide particles in the silicon carbide powder is preferably from 3 to 50 and further preferably from 3 to 40 μm. An average particle diameter of metal silicon (the metal silicon powder) is preferably from 2 to 35 μm. The average particle diameters of the silicon carbide particles and metal silicon (the metal silicon particles) are values measured by a laser diffraction method. It is to be noted that this is a blend of the forming raw material when the material of a honeycomb structure part is a silicon-silicon carbide composite material, and metal silicon is not added when the material of the honeycomb structure part is silicon carbide.

Examples of the binder include methylcellulose, and hydroxypropyl methylcellulose. A content of the binder is preferably from 2.0 to 10.0 parts by mass, when the total mass of the silicon carbide powder and the metal silicon powder is 100 parts by mass.

A content of the water is preferably from 20 to 60 parts by mass, when the total mass of the silicon carbide powder and the metal silicon powder is 100 parts by mass.

As the surfactant, ethylene glycol, dextrin or the like can be used. A content of the surfactant is preferably from 0.1 to 2.0 parts by mass, when the total mass of the silicon carbide powder and the metal silicon powder is 100 parts by mass.

There is not any special restriction on the pore former, as long as the pore former becomes pores after fired. Examples of the pore former include graphite, starch, resin balloons, a water-absorbing resin, and silica gel. A content of the pore former is preferably from 0.5 to 10.0 parts by mass, when the total mass of the silicon carbide powder and the metal silicon powder is 100 parts by mass.

Next, the forming raw material is preferably kneaded to form a kneaded material. There is not any special restriction on a method of kneading the forming raw material to form the kneaded material, and an example of the method is a method using a kneader, a vacuum clay kneader or the like.

Next, the kneaded material is preferably extruded to form the formed honeycomb body. At the extrusion-forming, a die having a desirable entire shape, cell shape, partition wall thickness, cell density or the like is preferably used. A material of the die is preferably a hard metal which does not easily wear down. A structure of the formed honeycomb body has partition walls with which a plurality of cells are formed to become through channels of a fluid and an outer peripheral wall positioned at the outermost periphery.

The obtained formed honeycomb body is preferably dried and fired to prepare the formed ceramic honeycomb body. It is to be noted that the formed ceramic honeycomb body is preferably prepared by firing the formed honeycomb body, but may be prepared by drying the formed honeycomb body.

Figure 7:
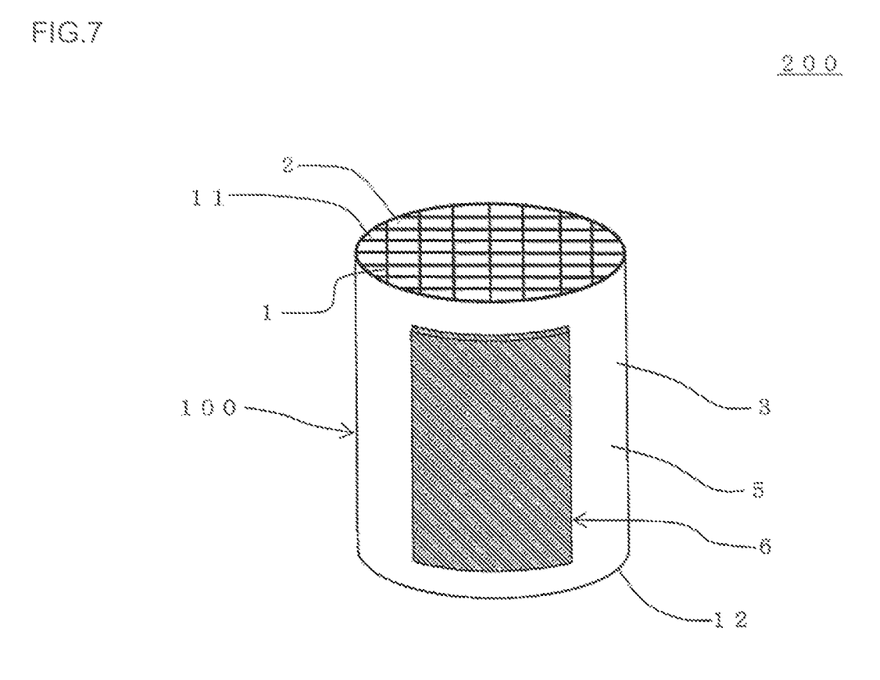
FIG. 7 is a perspective view schematically showing the formed honeycomb body with a paste for an electrode which is prepared in the manufacturing process of the honeycomb structure, in the embodiment of the manufacturing method of the honeycomb structure of the present invention.
Figure 8:
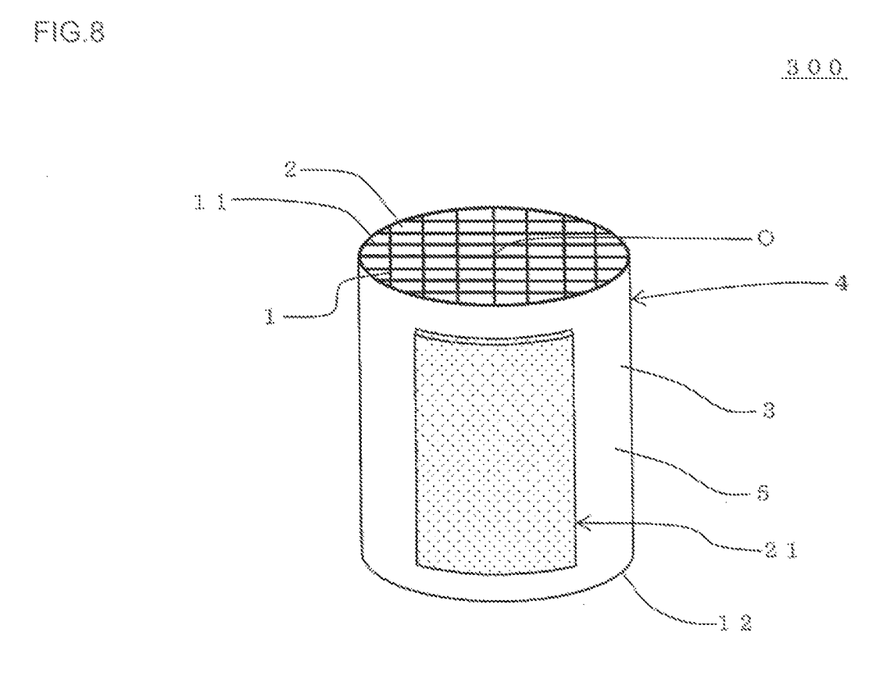
FIG. 8 is a perspective view schematically showing the honeycomb structure manufactured by the embodiment of the manufacturing method of the honeycomb structure of the present invention.

(1-2) Honeycomb Structure Forming Step:

Next, the formed honeycomb body 110 with the electrode forming sheets (see FIGS. 4 to 6) is fired to prepare a honeycomb structure 300 having a side surface provided with the electrodes (see FIG. 8). Alternatively, after removing the releasing sheets from the formed honeycomb body with electrode forming sheets to prepare a formed honeycomb body 200 with the paste for the electrode (see FIG. 7), the formed honeycomb body with the paste for the electrode may be fired to prepare the honeycomb structure 300 having the side surface provided with the electrodes (see FIG. 8). When the formed honeycomb body 110 with the electrode forming sheets is fired to prepare the honeycomb structure 300, the releasing sheets are burnt (burnt out) at the firing of the formed honeycomb body 110 with the electrode forming sheets. In consequence, the releasing sheets are removed from the formed honeycomb body with the electrode forming sheets. FIG. 7 is a perspective view schematically showing the formed honeycomb body 200 with the paste for the electrode which is prepared in the manufacturing process of the honeycomb structure, in the embodiment of the manufacturing method of the honeycomb structure of the present invention. FIG. 8 is a perspective view schematically showing the honeycomb structure 300 manufactured by the embodiment of the manufacturing method of the honeycomb structure of the present invention.

When the formed honeycomb body with the electrode forming sheets is fired and the formed ceramic honeycomb body is prepared by firing the formed honeycomb body, the electrode paste film is fired. Alternatively, when the formed ceramic honeycomb body is prepared by drying the formed honeycomb body, the formed ceramic honeycomb body and the electrode paste film are fired.

The formed honeycomb body with the electrode forming sheets is preferably dried before fired. Drying conditions are preferably from 50 to 100° C. At this time, at least the electrode paste film is dried.

Moreover, after drying the formed honeycomb body with the electrode forming sheets, calcinating is preferably performed to remove the binder and the like. The calcinating is preferably performed at 400 to 500° C. in the atmospheric air for 0.5 to 20 hours.

After drying the formed honeycomb body with the electrode forming sheets, the firing is preferably performed. As firing conditions, heating is preferably performed in an inert atmosphere of nitrogen, argon or the like at 1400 to 1500° C. for one to 20 hours. Moreover, after the firing, an oxygenation treatment is preferably performed at 1200 to 1350° C. for one to ten hours, to enhance durability.

There is not any special restriction on a calcinating and firing method, and the firing can be performed by using an electric furnace, a gas furnace or the like.

Moreover, when the obtained formed honeycomb body with the paste for the electrode is fired after removing the releasing sheet from the formed honeycomb body with the electrode forming sheets, there is not any special restriction on a method of removing the releasing sheet from the formed honeycomb body with the electrode forming sheets. An example of the method of removing the releasing sheet from the electrode paste film is a method of grasping and peeling the releasing sheet by hands or a machine.

A method of firing the formed honeycomb body 200 with the paste for the electrode (see FIG. 7) is preferably similar to the above method of firing the formed honeycomb body with the electrode forming sheets.

Next, another embodiment of the manufacturing method of the honeycomb structure of the present invention will be described. According to the manufacturing method of the honeycomb structure of the present embodiment, an electrode (the electrode paste film) is formed in two layers in the above-mentioned one embodiment of the manufacturing method of the honeycomb structure of the present invention. Therefore, the manufacturing method of the honeycomb structure of the present embodiment is preferably similar to the above-mentioned one embodiment of the manufacturing method of the honeycomb structure of the present invention, except that the electrode (the electrode paste film) is formed in two layers.

Figure 11:
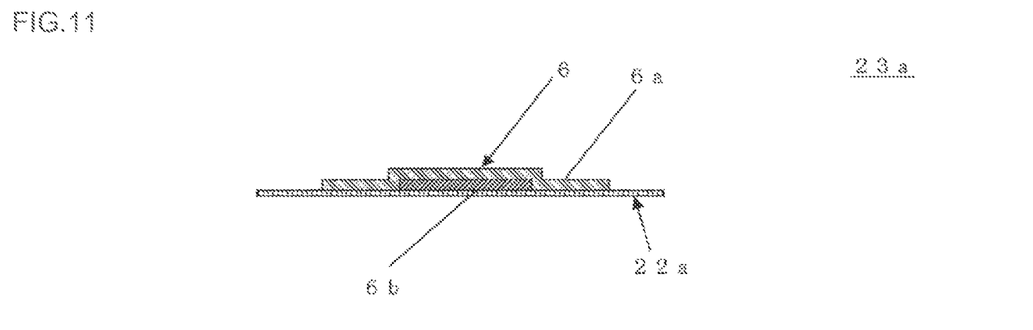
FIG. 11 is a cross-sectional view schematically showing an electrode forming sheet prepared in a manufacturing process of a honeycomb structure, in another embodiment of the manufacturing method of the honeycomb structure of the present invention.

In the manufacturing method of the honeycomb structure of the present embodiment, the surface of a releasing sheet is coated with a paste for the electrode, to prepare an electrode forming sheet in which one surface of the releasing sheet is provided with "the electrode paste film constituted of a plurality of electrode paste layers". Specifically, as shown in FIG. 11, when a releasing sheet 22a is coated with the paste for the electrode, an electrode paste layer 6b is formed, and then, an electrode paste layer 6a is formed on the electrode paste layer 6b. In consequence, there is obtained an electrode forming sheet 23a provided with an electrode paste film 6 constituted of two electrode paste layers. FIG. 11 is a cross-sectional view schematically showing the electrode forming sheet prepared in a manufacturing process of a honeycomb structure in the other embodiment of the manufacturing method of the honeycomb structure of the present invention.

Figure 12:
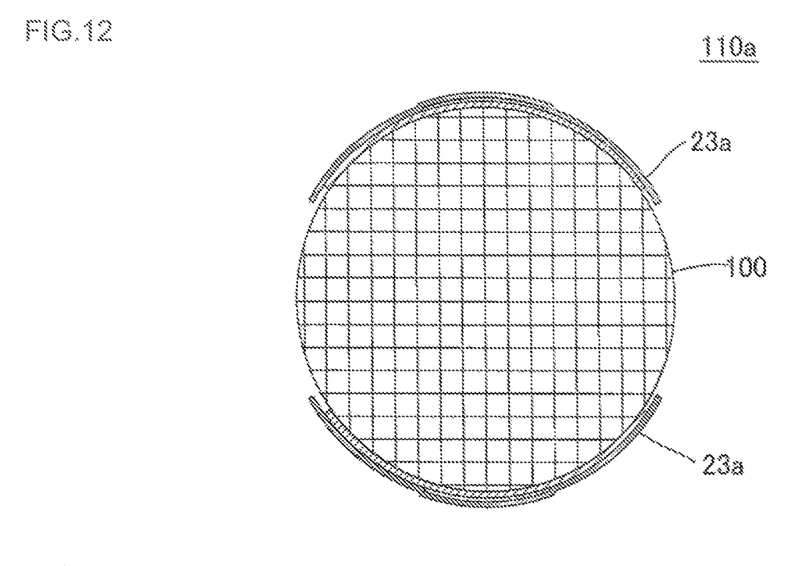
FIG. 12 is a cross-sectional view schematically showing a formed honeycomb body with the electrode forming sheets which is prepared in the manufacturing process of the honeycomb structure, in the other embodiment of the manufacturing method of the honeycomb structure of the present invention.

Then, as shown in FIG. 12, the electrode forming sheets 23a are attached to a formed ceramic honeycomb body 100, to obtain a formed honeycomb body 110a with the electrode forming sheets. FIG. 12 is a cross-sectional view schematically showing the formed honeycomb body with the electrode forming sheets which is prepared in the manufacturing process of the honeycomb structure, in the other embodiment of the manufacturing method of the honeycomb structure of the present invention.

Figure 13:
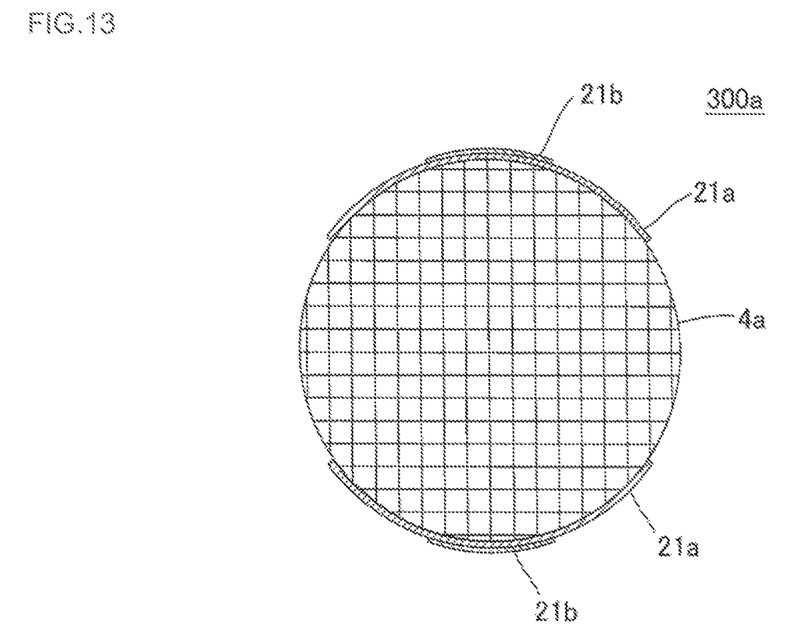
FIG. 13 is a cross-sectional view schematically showing a honeycomb structure manufactured by the other embodiment of the manufacturing method of the honeycomb structure of the present invention.

Then, the formed honeycomb body 110a with the electrode forming sheets or a formed honeycomb body with the paste for the electrode which is formed by peeling the releasing sheets from the formed honeycomb body 110a with the electrode forming sheets is fired, to obtain a honeycomb structure 300a (see FIG. 13). In the honeycomb structure 300a, a side surface of a honeycomb structure part 4a is provided with electrodes each having a laminated structure in which an electrode 21a and an electrode 21b are stacked. In consequence, according to the manufacturing method of the honeycomb structure of the present invention, the electrodes each having the laminated structure in which a plurality of electrodes are laminated can easily be prepared. FIG. 13 is a cross-sectional view schematically showing the honeycomb structure manufactured by the other embodiment of the manufacturing method of the honeycomb structure of the present invention.

(2) Honeycomb Structure:

Next, the honeycomb structure obtained by the one embodiment of the manufacturing method of the honeycomb structure of the present invention will be described.

The honeycomb structure obtained by the manufacturing method of the honeycomb structure of the present embodiment includes a tubular honeycomb structure part 4 and a pair of electrodes 21 as shown in FIG. 8. The honeycomb structure part 4 has porous partition walls 1 with which a plurality of cells 2 extending from one end surface 11 to the other end surface 12 are formed to become through channels of a fluid, and an outer peripheral wall 3 positioned at the outermost periphery. Moreover, a shape of the honeycomb structure part 4 is a tubular (cylindrical) shape in which "the side surface is a curved surface". Moreover, the pair of electrodes 21 are disposed on a side surface 5 of the honeycomb structure part 4. It is to be noted that one of the pair of electrodes 21 is shown, but the other electrode is not shown (see FIG. 8). A formed ceramic honeycomb body in the manufacturing method of the honeycomb structure of the present embodiment becomes the honeycomb structure part 4.

An electric resistivity of the honeycomb structure part 4 is preferably from 1 to 200 μm. In consequence, when a voltage is applied across the pair of electrodes, the honeycomb structure (the honeycomb structure part) can effectively generate heat. In particular, even when a current is allowed to flow by using a high voltage power source (e.g., from 12 to 900 V), the current does not excessively flow, and the honeycomb structure can suitably be used as a heater. It is to be noted that the electric resistivity of the honeycomb structure part is a value at 400° C. Moreover, the electric resistivity is a value measured by a four-terminal method.

Moreover, each of the pair of electrodes is formed into a strip-like shape which extends in an extending direction of the cells 2 of the honeycomb structure part 4, and in a cross section of the honeycomb structure which is orthogonal to the extending direction of the cells 2, one electrode 21 in the pair of electrodes is preferably disposed on a side opposite to the other electrode in the pair of electrodes via a center O of the honeycomb structure part 4. In consequence, when the voltage is applied across the pair of electrodes, a deviation of the current flowing through the honeycomb structure part 4 can be suppressed. Moreover, it is therefore possible to suppress a deviation of heat generation in the honeycomb structure part 4.

Figure 14:
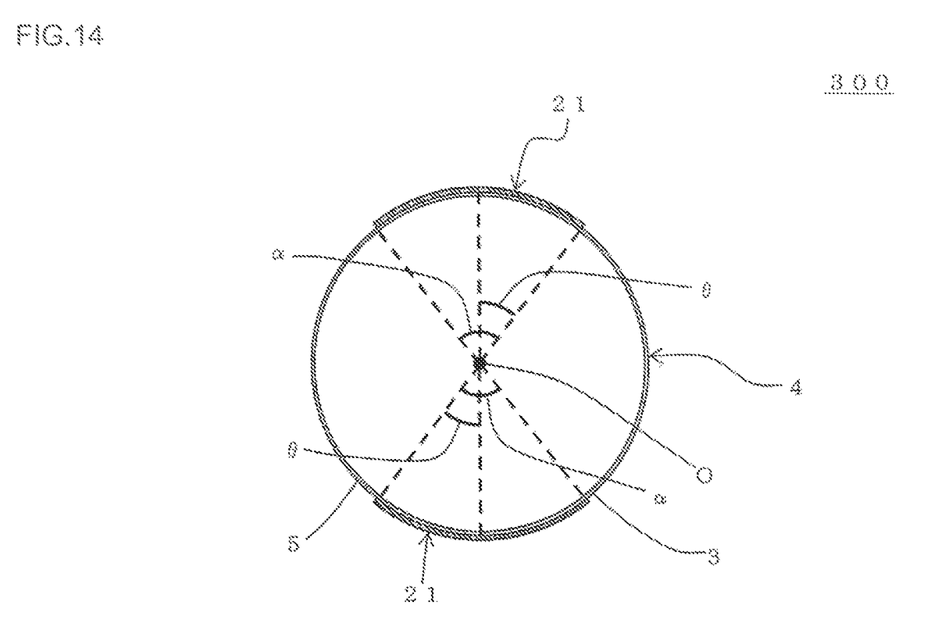
FIG. 14 is a schematic view showing a cross section orthogonal to a cell extending direction of the honeycomb structure manufactured by the embodiment of the manufacturing method of the honeycomb structure of the present invention.

Furthermore, in a cross section of the honeycomb structure obtained by the manufacturing method of the honeycomb structure of the present embodiment which is orthogonal to the cell extending direction, as shown in FIG. 14, 0.5 time a center angle α of each of the electrodes 21 and 21 (the angle θ) is preferably from 15° to 65°. In consequence, when the voltage is applied across the pair of electrodes 21 and 21, the deviation of the current flowing through the honeycomb structure part 4 can further be suppressed. In consequence, the deviation of the heat generation in the honeycomb structure part 4 can further be suppressed. According to the manufacturing method of the honeycomb structure of the present embodiment, the electrode paste films are preferably arranged in the formed ceramic honeycomb body so that the electrodes of the obtained honeycomb structure are formed in this way. FIG. 14 is a schematic view showing a cross section orthogonal to the cell extending direction of the honeycomb structure 300 manufactured by the one embodiment of the manufacturing method of the honeycomb structure of the present invention. It is to be noted that in FIG. 14, the partition walls (the cells) are omitted.

In the honeycomb structure 300, a material of the partition walls 1 and the outer peripheral wall 3 preferably mainly contains "the silicon-silicon carbide composite material" or "silicon carbide", and further preferably is the silicon-silicon carbide composite material or silicon carbide. When "the material of the partition walls 1 and the outer peripheral wall 3 mainly contains silicon carbide particles or silicon", it is meant that the partition walls 1 and the outer peripheral wall 3 contain 90 mass % or more of the silicon carbide particles and silicon in the whole material. By using such a material, the electric resistivity of the honeycomb structure part can be from 1 to 200 Ωcm. Here, the silicon-silicon carbide composite material contains the silicon carbide particles as aggregates, and silicon as a binding agent which binds the silicon carbide particles, and a plurality of silicon carbide particles are preferably bound by silicon so that pores are formed among the silicon carbide particles. Moreover, the above material "mainly containing silicon carbide" is obtained by sintering silicon carbide.

A thickness of each of the electrodes 21 is preferably from 0.010 to 5 mm, and further preferably from 0.1 to 0.25 mm. When the thickness is in such a range, the honeycomb structure part can evenly generate heat. Moreover, in this range, the electrodes can be prevented from being damaged at canning of the honeycomb structure. When the thickness of the electrode 21 is smaller than 0.010 mm, an electric resistance increases, and the heat cannot evenly be generated. When the thickness is larger than 5 mm, the electrodes are easily damaged at the canning. Moreover, the manufacturing method of the honeycomb structure of the present embodiment is a method of attaching the electrode forming sheets to the formed ceramic honeycomb body, and hence such thick electrodes each having a uniform thickness can be prepared on the curved surface (the side surface of the honeycomb structure part).

The electrodes 21 preferably mainly contain the silicon carbide particles and silicon, and are further preferably formed by using the silicon carbide particles and silicon as raw materials, except for usually contained impurities.

The electric resistivity of the electrode 21 is preferably from 0.1 to 100 Ωcm, and further preferably from 0.1 to 50 Ωm. When the electric resistivity of the electrode 21 is in such a range, the pair of electrodes 21 and 21 effectively serve as the electrodes in a piping line through which a high-temperature exhaust gas flows. In the honeycomb structure 300, the electric resistivity of the electrode 21 is preferably smaller than the electric resistivity of the honeycomb structure part 4. It is to be noted that the electric resistivity of the electrode is a value at 400° C. Moreover, the electric resistivity of the electrode is a value measured by a four-terminal method.

A porosity and an average pore diameter of the electrode 21 can suitably be determined in accordance with a use application so as to obtain a desirable electric resistivity.

A partition wall thickness, cell density, partition wall porosity, partition wall average pore diameter and outer peripheral wall thickness of the honeycomb structure 300 (the honeycomb structure part 4) can suitably be determined in accordance with the use application.

There is not any special restriction on a shape of the honeycomb structure 300 (the honeycomb structure part 4), as long as the honeycomb structure has a tubular shape in which a side surface (the outer peripheral surface) is a curved surface, and examples of the shape include a tubular shape in which the bottom surface (or a cross section orthogonal to a central axis) is round (the cylindrical shape), a tubular shape in which the bottom surface is oval, and a tubular shape in which the bottom surface is elliptic. Moreover, as a size of the honeycomb structure, an area of the bottom surface is preferably from 2000 to 20000 $mm^2$, and further preferably from 4000 to 10000 $mm^2$. Furthermore, a length of the honeycomb structure in a central axis direction is preferably from 50 to 200 mm, and further preferably from 75 to 150 mm.

In the honeycomb structure 300, a shape of each of the cells 2 in the cross section orthogonal to the extending direction of the cells 2 is preferably a quadrangular shape, a hexagonal shape, an octagonal shape or a combination of these shapes. When the cell shape is such a shape, a pressure loss at a time when an exhaust gas is allowed to flow through the honeycomb structure 300 decreases, and a purifying performance of a catalyst enhances.

EXAMPLES

Hereinafter, the present invention will further specifically be described with respect to examples, but the present invention is not limited to these examples.

Example 1

Silicon carbide (SiC) powder and metal silicon (Si) powder were mixed at a mass ratio of 80:20. Then, to this mixture, hydroxypropyl methylcellulose was added as a binder, and a water-absorbing resin was added as a pore former. Moreover, water was added to form a forming raw material. Then, the forming raw material was kneaded by a vacuum clay kneader, to prepare a columnar kneaded material. A content of the binder was 7 parts by mass, when a total of the silicon carbide (SiC) powder and the metal silicon (Si) powder was 100 parts by mass. A content of the pore former was 3 parts by mass, when the total of the silicon carbide (SiC) powder and the metal silicon (Si) powder was 100 parts by mass. A content of the water was 42 parts by mass, when the total of the silicon carbide (SiC) powder and the metal silicon (Si) powder was 100 parts by mass. An average particle diameter of the silicon carbide powder was 20 µm, and an average particle diameter of the metal silicon powder was 6 µm. Moreover, an average particle diameter of the pore former was 20 µm. The average particle diameter of silicon carbide, metal silicon and the pore former were values measured by a laser diffraction method.

The obtained columnar kneaded material was extruded by using an extrusion-forming machine, to obtain a formed honeycomb body. After drying the obtained formed honeycomb body by high frequency dielectric heating, the formed honeycomb body was dried at 120° C. for two hours by use of a hot air drier, and both end surfaces of the formed honeycomb body were cut as much as a predetermined amount.

Then, the dried formed honeycomb body was degreased, fired, and further subjected to an oxidation treatment to obtain a cylindrical formed ceramic honeycomb body. Degreasing conditions were 550° C. and three hours. Firing conditions were 1450° C. in an argon atmosphere and two hours. Conditions of the oxidation treatment were 1300° C. and one hour.

Next, silicon carbide (SiC) powder and metal silicon (Si) powder were mixed at a mass ratio of 60:40, and to this mixture, hydroxypropyl methylcellulose was added as a binder, glycerin was added as a moisture retaining agent, a surfactant was added as a dispersant, and water was further added, to mix these materials. The obtained mixture was kneaded to prepare a paste for an electrode. A content of the binder was 1.5 parts by mass, when a total of the silicon carbide (SiC) powder and the metal silicon (Si) powder was 100 parts by mass. A content of glycerin was 3 parts by mass, when the total of the silicon carbide (SiC) powder and the metal silicon (Si) powder was 100 parts by mass. A content of the surfactant was 0.3 part by mass, when the total of the silicon carbide (SiC) powder and the metal silicon (Si) powder was 100 parts by mass. A content of the water was 25 parts by mass, when the total of the silicon carbide (SiC) powder and the metal silicon (Si) powder was 100 parts by mass. An average particle diameter of the silicon carbide powder was 52 µm, and an average particle diameter of the metal silicon powder was 6 µm. The average particle diameters of silicon carbide and metal silicon were values measured by a laser diffraction method. The kneading was performed with a vertical stirrer. A viscosity of the paste for the electrode was 50000 mPa·s.

Next, a plate was used, and a releasing sheet was coated with the paste for the electrode by printing, to prepare an electrode forming sheet. Specifically, first, as shown in FIG. 9, a paste 31 for the electrode was held by (adhered onto) a printing screen 33 of a plate 32. In the plate 32, a frame member 32a was provided with the printing screen 33. Then, as shown in FIG. 10, the plate 32 which held the paste for the electrode was disposed on the surface of a releasing sheet 22. Then, a squeegee 34 was moved in one direction while pressing the releasing sheet 22 via the printing screen 33. In consequence, the releasing sheet 22 was coated with the paste 31 for the electrode which was held by the printing screen 33. Then, the releasing sheet 22 coated with the paste 31 for the electrode was further coated with the paste 31 for the electrode twice additionally. Then, the electrode forming sheet was thus obtained. By the above method, two electrode forming sheets were prepared. As the releasing sheet, a dust-free paper (made of petroleum) (trade name: New Clean Paper manufactured by Tochiman Co., Ltd.) was used. An angle of the squeegee was 70°, and a speed to move the squeegee was 30 mm/second. Moreover, a hardness of the squeegee was 70°. Furthermore, a pressure at which the printing screen was pressed by the squeegee was 0.19 MPa, and a back pressure of the squeegee was 0.1 MPa. Additionally, the printing screen was 80 mesh, and a gauze thickness of the printing screen was 55 μm. Moreover, an open area diameter of the printing screen was 263 μm, and a transmission volume was 69 cm$^3$/m$^2$.

Next, the two electrode forming sheets were attached to a side surface of the cylindrical formed ceramic honeycomb body, to prepare the formed honeycomb body with the electrode forming sheets. Specifically, first, the two electrode forming sheets were disposed (side by side) via a predetermined space on a base. At this time, each of the two electrode forming sheets was disposed so that the surface of an electrode paste film faces the upside in a vertical direction. Moreover, the space between the two electrode forming sheets was determined so that the two electrode forming sheets were attached to desirable positions of the formed ceramic honeycomb body. Then, the formed ceramic honeycomb body was rolled to pass on two electrode paste films. At this time, as the formed ceramic honeycomb body rolls on the electrode paste films, the electrode paste films (the electrode forming sheets) adhered on the side surface of the formed ceramic honeycomb body. When the cylindrical formed ceramic honeycomb body was rolled, the formed ceramic honeycomb body was rotated around a central axis. In this way, the two electrode forming sheets were attached to the side surface of the formed ceramic honeycomb body. Afterward, a roller was pressed onto the electrode forming sheets, and the two electrode forming sheets came in contact closely with the side surface of the formed ceramic honeycomb body.

Next, the formed honeycomb body with the electrode forming sheets was dried. Drying conditions were 70° C. Additionally, here, the electrode paste films were dried.

Afterward, the formed honeycomb body with the electrode forming sheets was degreased, fired, and further subjected to an oxidation treatment to obtain a honeycomb structure. Additionally, here, the electrode paste films were degreased, fired, and subjected to the oxidation treatment. Degreasing conditions were 550° C. and three hours. Firing conditions were 1450° C. in an argon atmosphere and two hours. Oxidation treatment conditions were 1300° C. and one hour.

The obtained honeycomb structure was cylindrical. Moreover, the bottom surface of the honeycomb structure had a round shape with a diameter of 90 mm, and a length of the honeycomb structure in a cell extending direction was 115 mm. Furthermore, a thickness of each of two electrodes was 250 μm, and the electrodes each having a uniform thickness were formed. Additionally, an electric resistivity of each electrode was 0.8 Ωcm, and an electric resistivity of a honeycomb structure part was 5 Ωcm. In the obtained honeycomb structure, air bubble was not generated in a space between each of the electrodes and the honeycomb structure part (air bubble: none). Moreover, in the obtained honeycomb structure, peel of the electrode did not take place (peel: none).

In Table 1, a column of "air bubble" in a column of "evaluation" indicates an air bubble state in a space between each of the electrodes and the honeycomb structure part. "None" indicates a state where the air bubble is not visually included. "Small" indicates a state where a small amount of air bubble is visually generated, but an electrode function is performed. Moreover, a column of "peel" in the column of "evaluation" indicates a peel state of each electrode from the honeycomb structure part.

"None" indicates a state where the peel does not visually take place. "Small" indicates a state where a small amount of peel visually takes place, but the electrode function is performed. Furthermore, a column of "general" in the column of "evaluation" indicates a general evaluation. When "air bubble" and "peel" are "none", the general evaluation is "A". When one of "air bubble" and "peel" is "small", the general evaluation is "B". When both of "air bubble" and "peel" are "small", the general evaluation is "C". Any one of "A", "B" and "C" is passable.

TABLE 1

| | Releasing sheet | Electrode thickness (μm) | Evaluation | | |
|---|---|---|---|---|---|
| | | | Air bubble | Peel | General |
| Example 1 | Dust-free paper (made of petroleum) | 250 | None | None | A |
| Example 2 | PET film | 250 | Small | Small | C |
| Example 3 | Dust-free paper | 250 | None | None | A |
| Example 4 | Release paper | 250 | Small | None | B |
| Example 5 | Plain paper | 250 | None | Small | B |
| Example 6 | Dust-free paper (made of petroleum) | 500 | None | None | A |

Examples 2 to 5

Honeycomb structures were prepared similarly to Example 1, except that a type of a releasing sheet was changed as shown in Table 1. Similarly to Example 1, an electrode thickness, "air bubble" and "peel" of each electrode were confirmed. Results are shown in Table 1.

As a PET film (a releasing sheet), trade name: Cerapeel manufactured by PANAC Co., Ltd. was used. Moreover, as a dust-free paper (the releasing sheet), trade name: STA-CLEAN manufactured by SAKURAI Co., Ltd. was used. Furthermore, as a release paper (the releasing sheet), trade name: Release Paper manufactured by LINTEC Corporation was used. As a plain paper, trade name: Monochrome A4 manufactured by Askul Co., Ltd. was used.

Example 6

A honeycomb structure was prepared similarly to Example 1, except that the number of coating times with a paste 31 for an electrode was six in total when coating a releasing sheet with the paste for the electrode by printing to prepare an electrode forming sheet. Similarly to Example 1, an electrode thickness, "air bubble" and electrode "peel" were confirmed. Results are shown in Table 1.

In the honeycomb structure of Example 1, electrodes each having a uniform thickness of 250 μm were formed. Moreover, in the honeycomb structure of Example 1, as the releasing sheet, the dust-free paper (made of petroleum) was used. Therefore, the air bubble was not mixed in the space between each of the electrodes and the honeycomb structure part, and the peel of the electrode did not take place. This is because the electrode forming sheets were attached to the formed ceramic honeycomb body before the releasing sheet dried, and the releasing sheet had a suitable gas permeability. As a result, air was not included, and it was possible to follow the shape of the honeycomb structure. In the honeycomb structure of Example 2, as the releasing sheet, the PET film was used. The PET film as the releasing sheet had a poor water absorption, and hence the releasing sheet did not dry. On the other hand, the PET film did not have any gas permeability, and hence a small amount of air was included in the space between the electrode and the honeycomb structure part. In the honeycomb structure of Example 3, as the releasing sheet, the dust-free paper was used. Therefore, any air bubble was not mixed in the space between the electrode and the honeycomb structure part, and the peel of the electrode did not take place. This was similar to Example 1, but the dust-free paper (made of petroleum) as the releasing sheet which was used in Example 1 had a higher effect of preventing the air bubble from being mixed in the space and preventing the peel of the electrode. In the honeycomb structure of Example 4, as the releasing sheet, the release paper was used. The release paper as the releasing sheet had little poor gas permeability, and hence a small amount of air was included in the space between the electrode and the honeycomb structure part. However, the electrodes did not peel. In the honeycomb structure of Example 5, as the releasing sheet, the plain paper was used. The plain paper as the releasing sheet had an excellent water absorption, and hence there was a tendency that the prepared electrode forming sheet progressively dried and did not easily adhere on the formed ceramic honeycomb body. Moreover, the PET film did not have flexibility, and hence did not easily follow the shape of the honeycomb structure (crease was generated), which resulted in poor evaluation. This was because the electrode forming sheet was attached to the formed ceramic honeycomb body before the releasing sheet dried. Moreover, the releasing sheet had a suitable gas permeability. As a result, air was not included, and it was possible to follow the shape of the honeycomb structure. In the honeycomb structure of Example 6, it was possible to form an electrode having a large thickness of 500 μm without generation of "air bubble or peel". The number of times of coating with the paste for the electrode was increased, thereby making it possible to suitably form a further thicker electrode (e.g., the electrode having a thickness of 5000 μm).

According to a manufacturing method of a honeycomb structure of the present invention, it is possible to prepare a honeycomb structure which can suitably be used as a catalyst support for an exhaust gas purifying device to purify an exhaust gas of a car.

DESCRIPTION OF REFERENCE MARKS

1: partition wall, 2: cell, 3: outer peripheral wall, 4 and 4a: honeycomb structure part, 5: side surface, 6: electrode paste film, 6a and 6b; electrode paste layer, 11: one end surface, 12: the other end surface, 21 and 21a: electrode, 22 and 22a: releasing sheet, 23 and 23a: electrode forming sheet, 31: paste for the electrode, 32: plate, 32a: frame member, 33: printing screen, 34: squeegee, 100: formed ceramic honeycomb body, 110 and 110a: formed honeycomb body with electrode forming sheet, 200: formed honeycomb body with the paste for the electrode, 300 and 300a: honeycomb structure, O: center, α: center angle, and θ: angle (of 0.5 time the center angle).

What is claimed is:

1. A manufacturing method of a honeycomb structure, comprising:
   a step of coating a surface of each of a plurality of releasing sheets with a paste for an electrode, to prepare electrode forming sheets in which the surface of each of the releasing sheets is provided with an electrode paste film, wherein a thickness of the releasing sheets is from 38 to 300 μm;
   a formed honeycomb body with the electrode forming sheets forming step of attaching the electrode forming sheets to a side surface of a tubular formed ceramic honeycomb body which is a curved surface, the formed ceramic honeycomb body having partition walls with which a plurality of cells extending from one end surface to another end surface are formed to become through channels of a fluid, and an outer peripheral wall positioned at the outermost periphery, so that the electrode paste films adhere on the side surface of the formed ceramic honeycomb body, to prepare a formed honeycomb body with the electrode forming sheets which is the formed ceramic honeycomb body having the side surface provided with the electrode forming sheets; and
   a honeycomb structure forming step of firing the formed honeycomb body with the electrode forming sheets, or removing the releasing sheets from the formed honeycomb body with the electrode forming sheets to form the formed honeycomb body with the pastes for the electrodes, and then firing the formed honeycomb body with the pastes for the electrodes, to obtain a honeycomb structure having the side surface provided with the electrodes of uniform thickness.

2. The manufacturing method of the honeycomb structure according to claim 1,
   wherein the surface of each of the releasing sheets is coated with the paste for the electrode, to prepare the electrode forming sheets in which the surface of each of the releasing sheets is provided with the electrode paste film constituted of a plurality of electrode paste layers.

3. The manufacturing method of the honeycomb structure according to claim 1, wherein a surface roughness Ra of the releasing sheet is from 0.05 to 10 μm.

4. The manufacturing method of the honeycomb structure according to claim 1, wherein the surface roughness Ra of the releasing sheet is smaller than a surface roughness Ra of the formed ceramic honeycomb body.

5. The manufacturing method of the honeycomb structure according to claim 1, wherein a water absorption of the releasing sheet is from 0.003 to 0.12 g/minute.

6. The manufacturing method of the honeycomb structure according to claim 1, wherein a thickness of each of the electrode paste films which adhere on the side surface of the formed honeycomb body with the pastes for the electrodes is from 10 to 5000 μm.

7. The manufacturing method of the honeycomb structure according to claim 2, wherein a thickness of each of the electrode paste films which adhere on the side surface of the formed honeycomb body with the pastes for the electrodes is from 10 to 5000 μm.

8. The manufacturing method of the honeycomb structure according to claim 3, wherein a thickness of each of the electrode paste films which adhere on the side surface of the formed honeycomb body with the pastes for the electrodes is from 10 to 5000 μm.

9. The manufacturing method of the honeycomb structure according to claim 4, wherein a thickness of each of the electrode paste films which adhere on the side surface of the formed honeycomb body with the pastes for the electrodes is from 10 to 5000 μm.

10. The manufacturing method of the honeycomb structure according to claim 5, wherein a thickness of each of the electrode paste films which adhere on the side surface of the formed honeycomb body with the pastes for the electrodes is from 10 to 5000 μm.

11. The manufacturing method of the honeycomb structure according to claim 1,
wherein in a cross section of the honeycomb structure which is orthogonal to an extending direction of the cells, 0.5 times a center angle of each of the electrodes is from 15° to 65°, which is the angle measured from the center of the cross section of the honeycomb body to edges of the electrodes on the side surface.

12. The manufacturing method of the honeycomb structure according to claim 2,
wherein in a cross section of the honeycomb structure which is orthogonal to an extending direction of the cells, 0.5 times a center angle of each of the electrodes is from 15° to 65°, which is the angle measured from the center of the cross section of the honeycomb body to edges of the electrodes on the side surface.

13. The manufacturing method of the honeycomb structure according to claim 3,
wherein in a cross section of the honeycomb structure which is orthogonal to an extending direction of the cells, 0.5 times a center angle of each of the electrodes is from 15° to 65°, which is the angle measured from the center of the cross section of the honeycomb body to edges of the electrodes on the side surface.

14. The manufacturing method of the honeycomb structure according to claim 4,
wherein in a cross section of the honeycomb structure which is orthogonal to an extending direction of the cells, 0.5 times a center angle of each of the electrodes is from 15° to 65°, which is the angle measured from the center of the cross section of the honeycomb body to edges of the electrodes on the side surface.

15. The manufacturing method of the honeycomb structure according to claim 5,
wherein in a cross section of the honeycomb structure which is orthogonal to an extending direction of the cells, 0.5 times a center angle of each of the electrodes is from 15° to 65°, which is the angle measured from the center of the cross section of the honeycomb body to edges of the electrodes on the side surface.

16. The manufacturing method of the honeycomb structure according to claim 6,
wherein in a cross section of the honeycomb structure which is orthogonal to an extending direction of the cells, 0.5 times a center angle of each of the electrodes is from 15° to 65°, which is the angle measured from the center of the cross section of the honeycomb body to edges of the electrodes on the side surface.

17. The manufacturing method of the honeycomb structure according to claim 7,
wherein in a cross section of the honeycomb structure which is orthogonal to an extending direction of the cells, 0.5 times a center angle of each of the electrodes is from 15° to 65°, which is the angle measured from the center of the cross section of the honeycomb body to edges of the electrodes on the side surface.

18. The manufacturing method of the honeycomb structure according to claim 8,
wherein in a cross section of the honeycomb structure which is orthogonal to an extending direction of the cells, 0.5 times a center angle of each of the electrodes is from 15° to 65°, which is the angle measured from the center of the cross section of the honeycomb body to edges of the electrodes on the side surface.

19. The manufacturing method of the honeycomb structure according to claim 9,
wherein in a cross section of the honeycomb structure which is orthogonal to an extending direction of the cells, 0.5 times a center angle of each of the electrodes is from 15° to 65°, which is the angle measured from the center of the cross section of the honeycomb body to edges of the electrodes on the side surface.

20. The manufacturing method of the honeycomb structure according to claim 10,
wherein in a cross section of the honeycomb structure which is orthogonal to an extending direction of the cells, 0.5 times a center angle of each of the electrodes is from 15° to 65°, which is the angle measured from the center of the cross section of the honeycomb body to edges of the electrodes on the side surface.

\* \* \* \* \*